US012024084B2

(12) United States Patent
Lee et al.

(10) Patent No.: US 12,024,084 B2
(45) Date of Patent: Jul. 2, 2024

(54) ANTI-ROLLOUT ASSEMBLIES AND SYSTEMS FOR CARGO HANDLING SYSTEM

(71) Applicant: GOODRICH CORPORATION, Charlotte, NC (US)

(72) Inventors: Brandon David Lee, Wahpeton, ND (US); Wallace Harold Larson, Jamestown, ND (US); Michael David Schuh, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 768 days.

(21) Appl. No.: 17/115,597

(22) Filed: Dec. 8, 2020

(65) Prior Publication Data
US 2022/0176868 A1 Jun. 9, 2022

(51) Int. Cl.
*B60P 7/08* (2006.01)
*B60P 7/13* (2006.01)
*B64D 9/00* (2006.01)

(52) U.S. Cl.
CPC .............. *B60P 7/13* (2013.01); *B64D 9/003* (2013.01)

(58) Field of Classification Search
CPC .. B60P 7/13; B60P 7/0892; B60P 7/10; B60P 7/08; B64D 9/003
USPC ............................. 410/69, 77–80, 92, 94, 95
See application file for complete search history.

(56) References Cited

U.S. PATENT DOCUMENTS

| | | | |
|---|---|---|---|
| 4,583,896 A | 4/1986 | Vogg et al. | |
| 5,004,387 A | 4/1991 | Jensen et al. | |
| 5,090,638 A * | 2/1992 | Eilenstein-Wiegmanns | B64D 9/003 410/69 |
| 6,557,800 B2 | 5/2003 | Medina et al. | |
| 6,729,818 B1 | 5/2004 | Yee et al. | |
| 7,530,774 B2 | 5/2009 | Roberts | |
| 7,581,908 B1 * | 9/2009 | Hamel | B60R 7/08 410/94 |
| 7,854,579 B2 | 12/2010 | Roberts | |
| 8,038,373 B2 | 10/2011 | Dugie | |
| 2003/0057326 A1 | 3/2003 | Medina et al. | |
| 2004/0265085 A1 * | 12/2004 | Mayer | B60P 7/13 410/77 |
| 2005/0008443 A1 * | 1/2005 | Eitzenberger | B60P 7/13 410/94 |

(Continued)

OTHER PUBLICATIONS

European Patent Office, European Search Report dated May 17, 2022 in Application No. 21209881.8.

*Primary Examiner* — Stephen T Gordon
(74) *Attorney, Agent, or Firm* — SNELL & WILMER L.L.P.

(57) ABSTRACT

An anti-rollout assembly may comprise: a housing defining a cavity; a guide/restraint head pivotably coupled to the housing at a first end of the cavity; an overridable trigger pivotably coupled to the housing at a second end of the cavity, the second end opposite the first end; and a locking system operably coupled to the guide/restraint head and the overridable trigger, the locking system configured to bias the guide/restraint head into an upright position, the locking system configured to retract the guide/restraint head into the cavity in response to a first lateral force driving the overridable trigger. The locking system may comprise a drive link and a locking link and be configured to lock the guide/restraint head in a raised state.

13 Claims, 9 Drawing Sheets

SECT A-A

(56) References Cited

U.S. PATENT DOCUMENTS

2009/0016838 A1 1/2009 Roberts
2012/0275877 A1* 11/2012 Moradians ............... B60P 7/06
   410/104

* cited by examiner

SECT A-A

SECT A-A

SECT A-A

SECT A-A

SECT B-B

ANTI-ROLLOUT ASSEMBLIES AND SYSTEMS FOR CARGO HANDLING SYSTEM

FIELD

The disclosure relates generally to anti-rollout assemblies, and more particularly, to systems and devices for preventing cargo rollout in cargo handling systems.

BACKGROUND

Rollers, casters, and other wheeled mechanisms are often used to convey loads. In an entrance area of a cargo handling system, the cargo handling system may include an overridable component configured to prevent cargo from traveling back out the doorway once loaded. The overridable component may be limited in size by the storage housing for the overridable component. The restraint face of the overridable component may be limited by a retraction direction of the overridable component.

SUMMARY

An anti-rollout assembly is disclosed herein. The anti-rollout assembly may comprise: a housing defining a cavity; a guide/restraint head pivotably coupled to the housing at a first end of the cavity; an overridable trigger pivotably coupled to the housing at a second end of the cavity, the second end opposite the first end; and a locking system operably coupled to the guide/restraint head and the overridable trigger, the locking system configured to bias the guide/restraint head into an upright position, the locking system configured to retract the guide/restraint head into the cavity in response to a first lateral force driving the overridable trigger.

In various embodiments, the locking system further comprises a locking link and a driving link. The driving link may be pivotably coupled to the overridable trigger and slidingly coupled to the guide/restraint head. The locking link may be pivotably coupled to the housing or the overridable trigger and configured to interface with a mating surface of the guide/restraint head when the guide/restraint head is in a raised state. The locking system may further comprise a pin fixedly or rotatably coupled to the driving link, the pin configured to interface with a notch generated by a tab in the locking link in response to the anti-rollout assembly being in a raised state. The pin may be configured to drive the locking link down in response to rolling or sliding over the tab during lowering of the guide/restraint head. The guide/restraint head may comprise a guide face, and the locking link locks the guide/restraint head in the upright position in response to a second lateral force being exerted on the guide face. The guide/restraint head may further comprise a first roller or a first tapered surface on a first longitudinal end of the guide/restraint head and a second roller or second tapered surface on a second longitudinal end of the guide/restraint head. The first roller may be configured to guide a tab of a pallet toward the guide face in response to the pallet traveling longitudinally along a cargo deck.

An anti-rollout system for use in a cargo handling system is disclosed herein. The anti-rollout system may comprise: a cargo deck having an entranceway; and an anti-rollout assembly coupled to the cargo deck and disposed proximate the entranceway, the anti-rollout assembly being biased towards a raised position, the anti-rollout assembly configured to retract into an overridable position in response to a cargo traveling over the anti-rollout assembly during loading, the anti-rollout assembly configured to arise to the raised position in response to the cargo traveling past the anti-rollout assembly in a first direction.

In various embodiments, the anti-rollout assembly may further comprise: a first overridable trigger disposed proximate the entranceway; a first guide/restraint head having a first guide face defining the first direction when the first guide/restraint head is in a raised state, the first guide/restraint head disposed distal to the first overridable trigger in the lateral direction; a second overridable trigger disposed distal to the first guide/restraint head in the lateral direction; and a second guide/restraint head disposed distal to the second overridable trigger in the lateral direction. The first overridable trigger may be configured to retract the first guide/restraint head in response to a first lateral force being disposed on the first overridable trigger; and the second overridable trigger is configured to retract the second guide/restraint head in response to a second lateral force being disposed on the second overridable trigger. The anti-rollout system may further comprise a plurality of the anti-rollout assembly spaced longitudinally along the entranceway. The anti-rollout assembly may further comprise a first locking system and a second locking system, the first locking system operably coupling the first overridable trigger to the first guide/restraint head, the second locking system operably coupling the second overridable trigger to the second guide/restraint head. The anti-rollout assembly may further comprise: a housing coupled to the cargo deck, the housing defining a cavity; a guide/restraint head pivotably coupled to the housing; an overridable trigger pivotably coupled to the housing, the overridable trigger configured to rotate in a first direction in response to a first lateral force driving the overridable trigger, wherein the guide/restraint head is configured to rotate in a second direction in response to the overridable trigger rotating in the first direction, the first direction being opposite the second direction. The guide/restraint head may be driven into the overridable position in response to the cargo traveling over the overridable trigger.

A method of using an anti-rollout system is disclosed herein. The method may comprise: sliding a cargo in a lateral direction through an entranceway of a cargo handling system; rotating an overridable trigger of an anti-rollout assembly in a first direction in response to the cargo exerting a lateral force on the overridable trigger; rotating a guide/restraint head of the anti-rollout assembly in a second direction in response to the overridable trigger rotating the first direction, the first direction being opposite the second direction; retracting the anti-rollout assembly into a overridable position in response to the cargo traveling over the anti-rollout assembly; and arising the anti-rollout assembly into a raised position in response to the cargo passing the anti-rollout assembly in the lateral direction.

In various embodiments, the method may further comprise sliding the cargo in a longitudinal direction through a cargo compartment; and guiding a tab of a pallet of the cargo to a guide face of the guide/restraint head in response to sliding the cargo in the longitudinal direction. The anti-rollout assembly may be locked in the raised position in response to the cargo exerting a force on the anti-rollout assembly in the lateral direction. The anti-rollout assembly may comprise a locking system operably coupled to the guide/restraint head and the overridable trigger.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

In various embodiments, an anti-rollout assembly for use in a cargo handling system is disclosed herein. In various embodiments, the anti-rollout assembly may be configured to retract in response to cargo traveling into a cargo entranceway. In various embodiments, the anti-rollout assembly may be configured to prevent rollout of cargo in response to being in a non-retracted state. In various embodiments, the anti-rollout assembly may comprise a guide/restraint head, an overridable trigger, and a locking system. In various embodiments, the locking system may comprise a locking link and a guide element (e.g., a guide pin).

Figure 1:
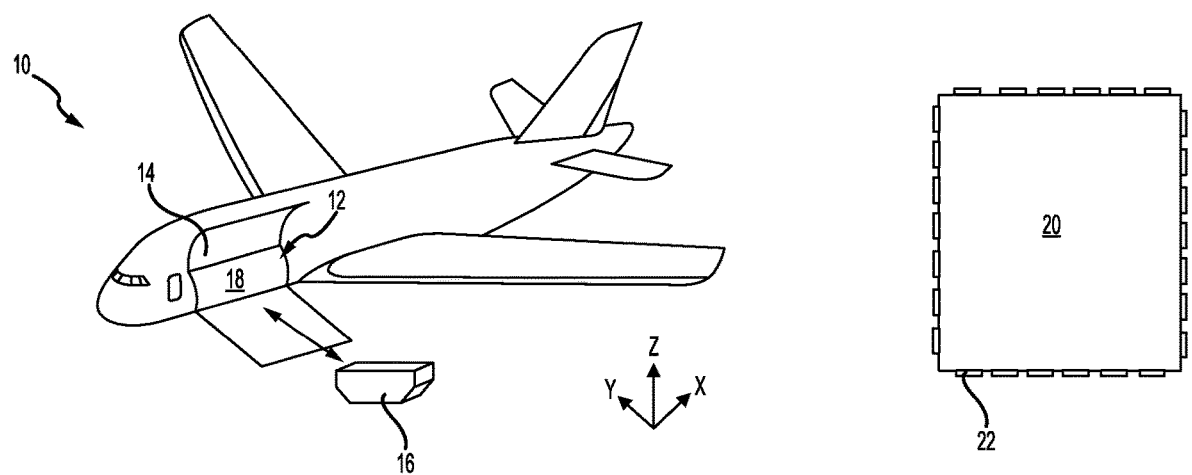
FIG. 1 illustrates an aircraft being loaded with cargo, in accordance with various embodiments.

With reference to FIG. 1, an aircraft 10 is illustrated having a cargo compartment 12. A cargo door 14 provides access to cargo compartment 12 from outside aircraft 10. In various embodiments, cargo 16 may comprise a pallet 20, which may be loaded and unloaded through cargo door 14 and onto a cargo deck 18 of aircraft 10. In various embodiments, the pallet 20 may comprise a plurality of tabs 22 disposed around a perimeter of the pallet 20. In various embodiments, a gap between adjacent tabs in the plurality of tabs 22 may cause a guide/restraint head to wear during loading of a cargo compartment 12 as described further herein. In various embodiments, cargo deck 18 may be equipped with one or more power drive units (PDUs) configured to propel cargo 16 across cargo deck 18 in a desired direction.

Figure 2:
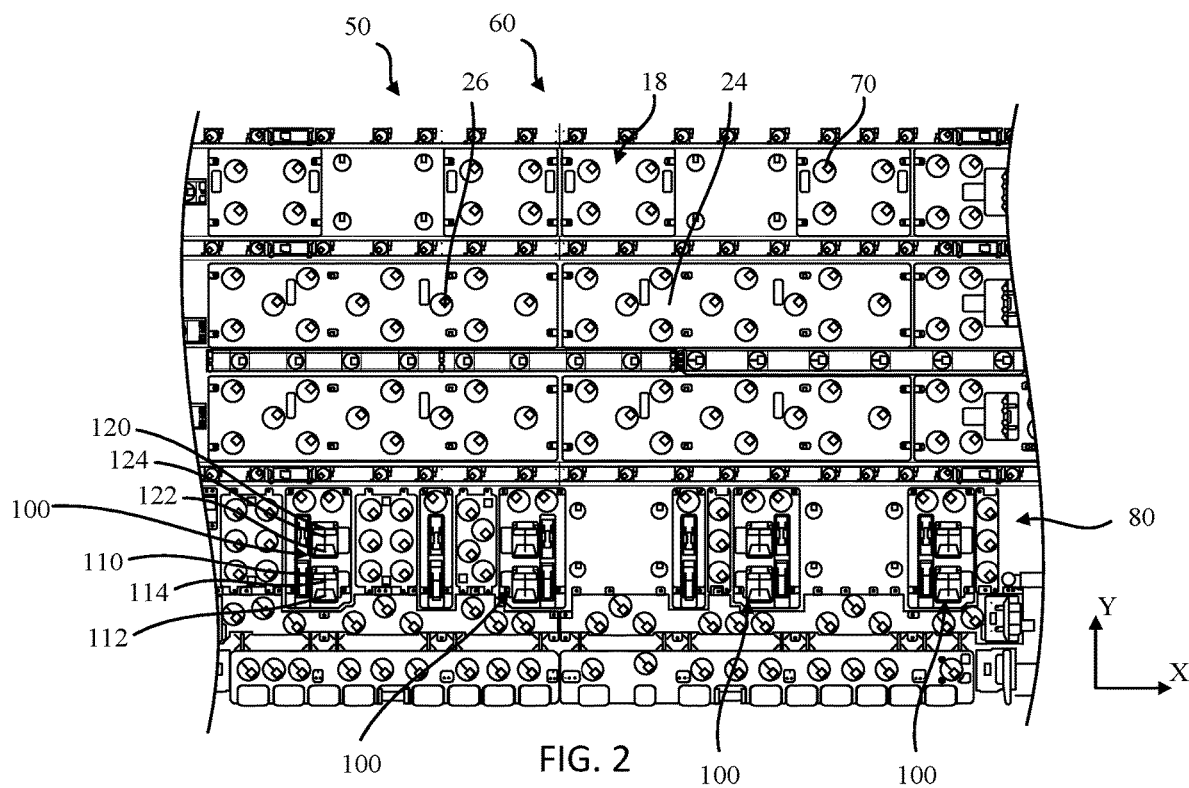
FIG. 2 illustrates a portion of an aircraft cargo deck having an anti-rollout system, in accordance with various embodiments.

With reference to FIG. 2, a cargo handling system 50 including a cargo entranceway 60 of the cargo deck 18 is illustrated, in accordance with various embodiments. The cargo deck 18 may include one or more caster panels 24. Although shown with caster panels 24, the cargo handling system may comprise ball mats, in various embodiments. Caster panels 24 may include a plurality of freely rotating casters 26. In various embodiments, a number of PDUs may be mounted along cargo deck 18. For example, PDUs 28 may be located in caster panels 24. PDUs are configured to propel cargo over conveyance casters 26 across cargo deck 18. In various embodiments, the cargo handling system 50 includes an anti-rollout system 80 having a plurality of anti-rollout assemblies 100 spaced apart longitudinally (e.g., X direction) proximate cargo door 14 from FIG. 1.

In various embodiments, each anti-rollout apparatus in the plurality of anti-rollout assemblies 100 are configured to retract in response to a cargo 16 from FIG. 1 rolling over the respective anti-rollout apparatus in the lateral direction (e.g., the Y direction) and arise in response to the cargo 16 from FIG. 1 passing a respective anti-rollout apparatus in the lateral direction (e.g., the Y direction). The number of anti-rollout apparatuses per anti-rollout assembly in the plurality of anti-rollout assemblies 100 is not limited to two, as illustrated in FIG. 2. In various embodiments, each anti-rollout assembly 100 includes a first guide/restraint head 110, a first overridable trigger 112, a first locking system 114, a second guide/restraint head 120, a second overridable trigger 122, and a second locking system 124. The first guide/restraint head 110 may be disposed proximate cargo door 14 from FIG. 1 and the second guide/restraint head 120 may be spaced apart laterally (e.g., in the Y-direction) distally from the cargo door 14 from FIG. 1. In various embodiments, by having multiple guide/restraint heads per anti-rollout assembly in the plurality of anti-rollout assemblies 100, a number of different size cargo (e.g., cargo 16 of various sizes) may be utilized by the cargo handling system 50.

In various embodiments, cargo 16 from FIG. 1 is loaded in a lateral direction (e.g., Y direction) into the cargo entranceway 60. In various embodiments, the first overridable trigger 112 drives the first locking system 114 and the first guide/restraint head 110, which retracts the first guide/restraint head 110 into a housing of a respective anti-rollout assembly in response to cargo 16 from FIG. 1 rolling over the respective overridable trigger 112. In various embodiments, the first guide/restraint head 110 arises in response to the cargo 16 from FIG. 1 passing the first guide/restraint head 110 in the lateral direction (e.g., the Y-direction), as described further herein. In various embodiments, the second guide/restraint head 120, the second overridable trigger 122, and the second locking system 124 are configured in the same manner as the first guide/restraint head 110, the first overridable trigger 112, and the first locking system 114.

Figure 3:
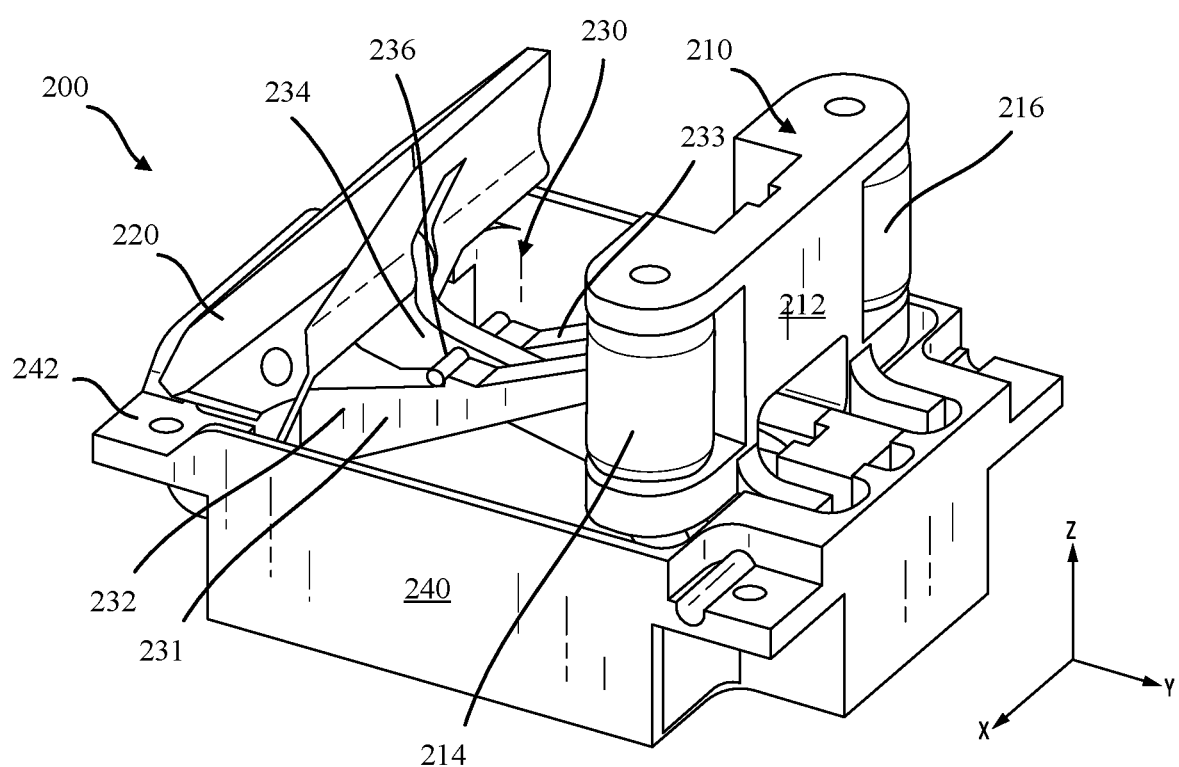
FIG. 3 illustrates an axonometric view of an anti-rollout assembly, in accordance with various embodiments.
Figure 4:
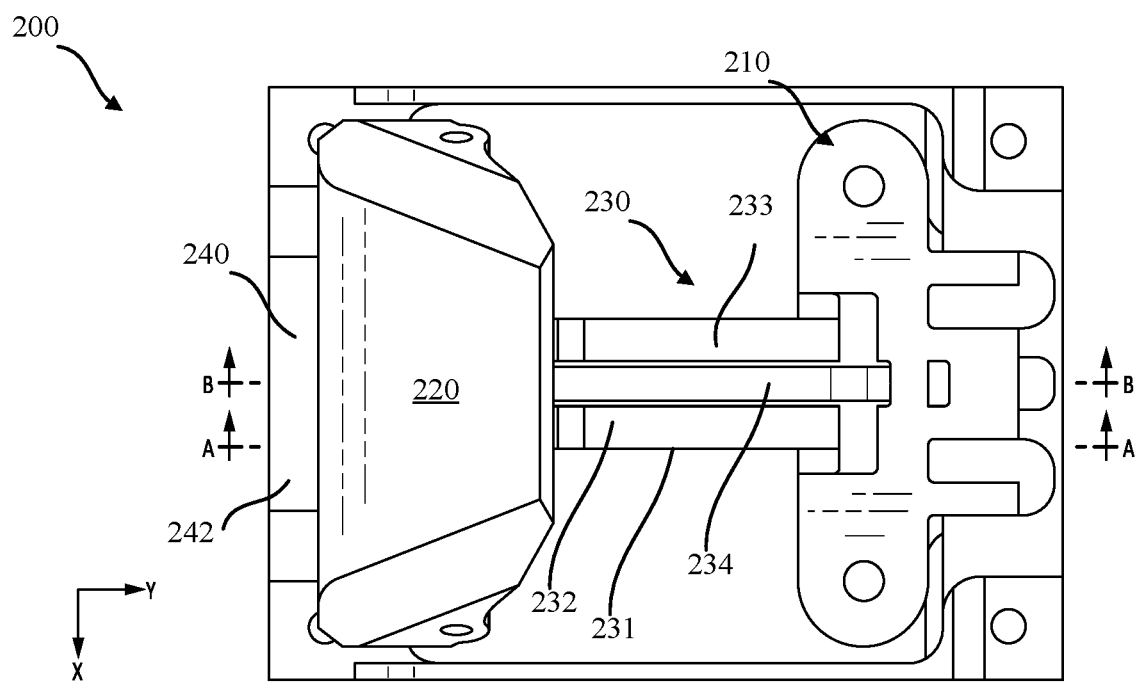
FIG. 4 illustrates a top view of an anti-rollout assembly, in accordance with various embodiments.

Referring now to FIGS. 3 and 4, an anti-rollout assembly 200 having a single guide/restraint head 210 is illustrated in a raised state, in accordance with various embodiments. FIG. 3 illustrates an axonometric view of the anti-rollout assembly 200, and FIG. 4 illustrates a top view of the anti-rollout assembly 200, in accordance with various embodiments. In various embodiments, the anti-rollout assembly 200 comprises the guide/restraint head 210, an overridable trigger 220, a locking system 230, and a housing 240. In various embodiments, the guide/restraint heads 110, 120 from FIG. 2 are in accordance with the guide/restraint head 210, the overridable triggers 112, 122 are in accordance with the overridable trigger 220, and the locking systems 114, 124 are in accordance with the locking system 230. Although illustrated as having only a guide/restraint head 210, the anti-rollout assembly 200 is not limited in this regard, and the anti-rollout assembly 200 could include a plurality of the guide/restraint head 210 (e.g., first guide/restraint head 110 and second guide/restraint head 120 as illustrated in FIG. 2), in accordance with various embodiments.

The locking system 230 may comprise a drive link 234, a locking link 232, and a pin 236. In various embodiments, the locking link 232 may comprise a first arm 231 and a second arm 233. Although illustrates as having two arms 231, 233, the locking link is not limited in this regard. For example, the locking link 232 could include a single arm, in accordance with various embodiments. The drive link 234 may extend from a first end of the overridable trigger 220 to a first end of the guide/restraint head 210. The locking link 232 may be pivotally coupled to the housing 240 proximate a first end 242 of the housing 240.

In various embodiments, the guide/restraint head 210 is operably coupled to the overridable trigger 220 via the locking system 230. In particular, in various embodiments, the drive link 234 is pivotally coupled to the overridable trigger 220 via a pin or the like, slidingly coupled to the guide/restraint head 210 via a pin, or the like, and configured to retract the guide/restraint head 210 into the housing 240 in response to experiencing a force in the lateral direction (e.g., the +Y-direction). In various embodiments, at an end of the overridable trigger 220 proximal the housing 240, the drive link is pivotally coupled to the overridable trigger 220 via a pin, or the like. In various embodiments, at an end proximal the housing, the guide/restraint head 210 and the drive link 234 are slidingly coupled.

In various embodiments, the guide/restraint head 210 comprises a guide face 212, a first roller 214, and a second roller 216. Although illustrated as including a first roller 214 and a second roller 216, the anti-rollout assembly is not limited in this regard. In particular, in various embodiments, the guide/restraint head may include the guide face 212 and tapered ends where the first roller 214 and the second roller 216 are illustrated. In various embodiments, the first roller 214 may be disposed on a first longitudinal end of the guide/restraint head 210 and the second roller 216 may be disposed on a second longitudinal end of the guide/restraint head 210, the second longitudinal end disposed opposite the first longitudinal end. In various embodiments, the rollers 214, 216 may be configured to act as a guide for a pallet (e.g., pallet 20 from FIG. 1), that has a plurality of tabs (e.g., the plurality of tabs 22 from FIG. 1). For example, a tab in the plurality of tabs 22 from FIG. 1 may contact the first roller when traveling in the longitudinal direction (e.g., −X-direction) and be guided laterally (e.g., in the +Y-direction) to the guide face 212 of the guide/restraint head 210, and then contact the second roller 216 and slide off the guide/restraint head 210. Then, in accordance with various embodiments, an adjacent tab in the plurality of tabs 22 from FIG. 1 may contact the first roller 214 and the process may continue. Thus, in accordance with various embodiments, the first roller 214 and the second roller 216 may be configured to reduce wear of the guide/restraint head 210 during loading of a cargo compartment, in accordance with various embodiments.

In various embodiments, the anti-rollout assembly 200, as disclosed herein, provides for a wider guide/restraint head 210. In this regard, the retracting and extending of the guide/restraint head 210 being along the lateral direction (e.g., +/−Y-direction), a width of the guide/restraint head 210 is no longer limited by a depth of the housing 240. In various embodiments, with brief reference to FIG. 2, by retracting and extending of the guide/restraint head 210 along the lateral direction, a single guide/restraint head may extend across an entire length or substantially an entire length of an entranceway 60, in accordance with various embodiments.

Figure 5A:
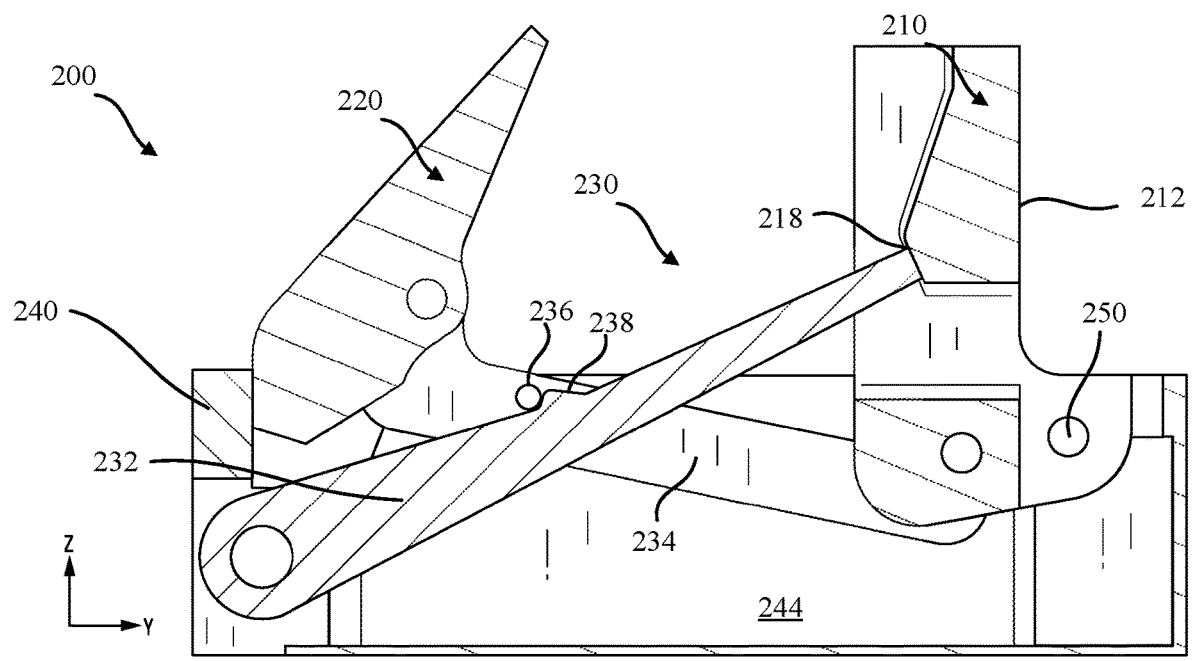
FIG. 5A illustrates a cross-sectional view along section A-A of FIG. 4 of an anti-rollout assembly in a raised state, in accordance with various embodiments.

Referring now to FIG. 5A, a cross-sectional view of the anti-rollout assembly 200 in a raised state is illustrated, in accordance with various embodiments. In various embodiments, the anti-rollout assembly 200 is biased into a raised state. In this regard, the guide/restraint head 210 is pivotably coupled to the housing 240 via a torsion spring 250, or the like. In this regard, the torsion spring 250 is configured to bias the guide/restraint head 210 in an upward position, as illustrated in FIG. 5A.

In various embodiments, when the anti-rollout assembly 200 is in the raised position, the locking system 230 is configured to lock the guide/restraint head 210 in a vertical position. In this regard, the locking link 232 interfaces with a mating surface 218 of the guide/restraint head 210 in response to the anti-rollout assembly being in a raised state. In various embodiments, the locking link 232 would prevent a lateral force exerted on guide face 212 of the guide/restraint head 210 from a pallet (e.g., pallet 20 from FIG. 1) from causing the anti-rollout assembly 200 to retract. Thus, the locking system 230 is configured to ensure the guide/restraint head 210 remains raised to guide a pallet (e.g., pallet 20 from FIG. 1) after the pallet is on and within the entranceway 60 from FIG. 2, in accordance with various embodiments.

In various embodiments, the locking link 232 may comprise a tab 238 configured to interface with the pin 236 of the locking system 230, when the anti-rollout assembly is in the raised state. In various embodiments, the tab 238 and pin 236 interface may act as a redundant locking mechanism for the anti-rollout assembly 200, in accordance with various embodiments.

In various embodiments, the housing 240 defines a cavity 244 disposed therein. In various embodiments, the cavity 244 is configured to receive the guide/restraint head 210, the overridable trigger 220, and the locking system 230 therein. In this regard, in response to a pallet (e.g., pallet 20 from FIG. 1) rolling laterally into the overridable trigger 220, the overridable trigger 220, the locking system 230, and the guide/restraint head 210 are stowed in the cavity 244, as described further herein.

Figure 5B:
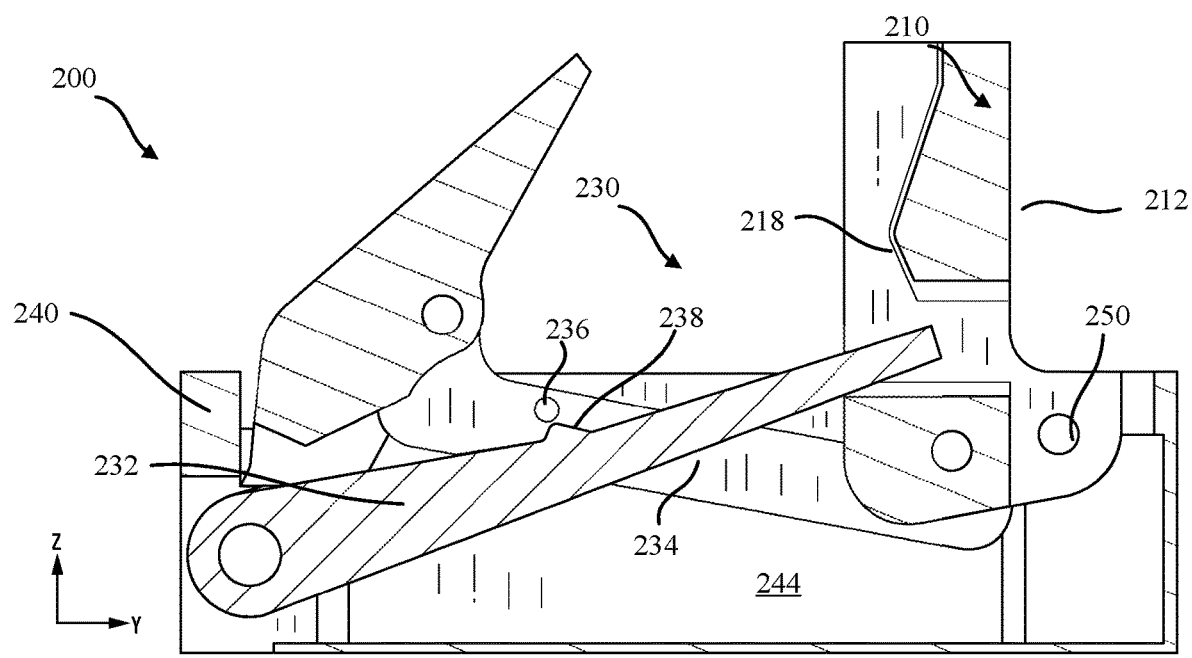
FIG. 5B illustrates a cross-sectional view along section A-A of FIG. 4 during retraction of the anti-rollout assembly in accordance with various embodiments.
Figure 5C:
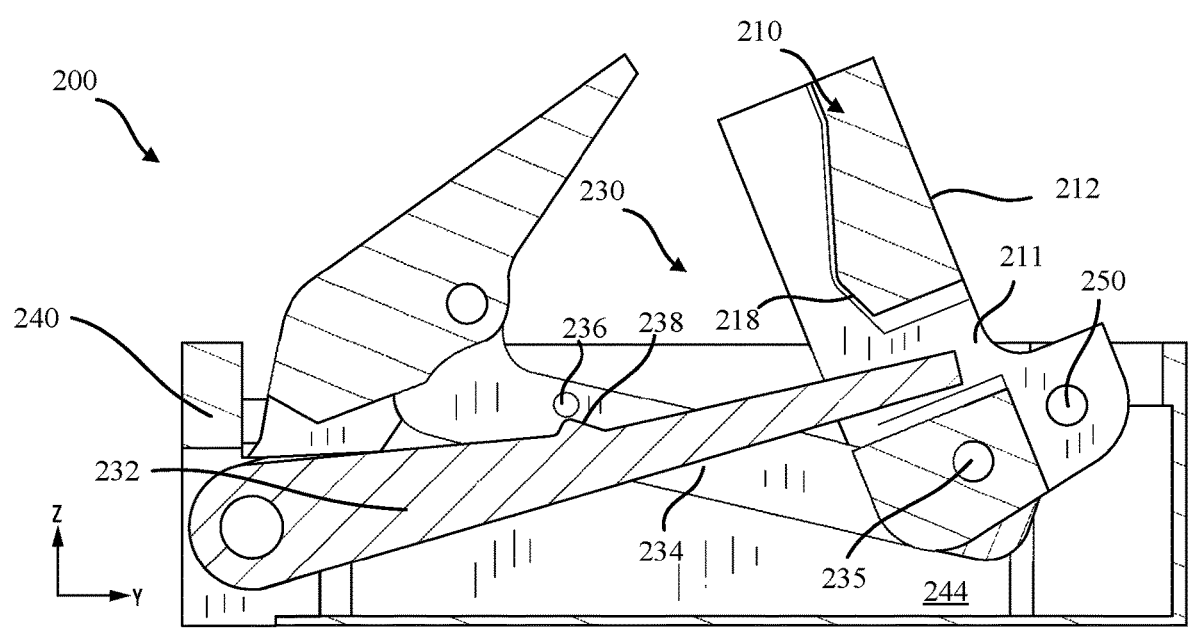
FIG. 5C illustrates a cross-sectional view along section A-A of FIG. 4 during retraction of the anti-rollout assembly in accordance with various embodiments.
Figure 5D:
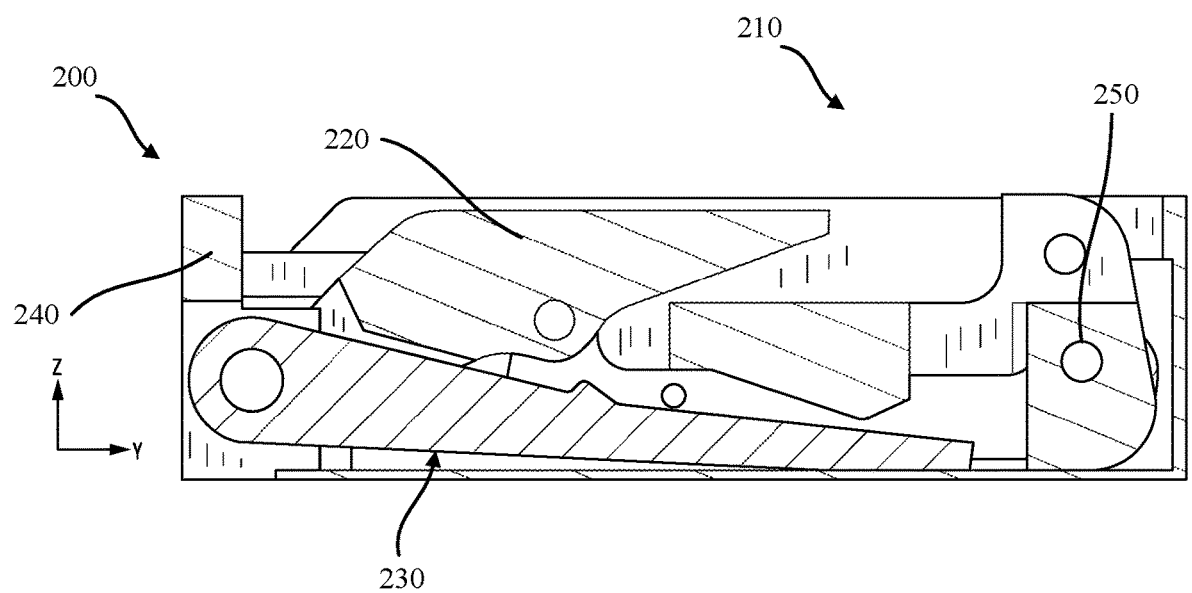
FIG. 5D illustrates a cross-sectional view along section A-A of FIG. 4 during retraction of the anti-rollout assembly in accordance with various embodiments.

Referring now to FIGS. 5B-5D, a cross-sectional view of the anti-rollout assembly 200 along section A-A from FIG. 4 during retraction from a pallet (e.g., pallet 20 from FIG. 1) rolling over the anti-rollout assembly in a lateral direction (e.g., the +Y-direction) is illustrated in accordance with various embodiments. In various embodiments, in response to an initial force on the overridable trigger 220 in a lateral direction (e.g., Y-direction), the drive link 234 moves laterally toward the guide/restraint head 210, the pin 236 travels over the tab 238 of the locking link 232 driving the locking link downward away from the mating surface 218 of the guide/restraint head 210. In this regard, the pin 236 and the tab 238 interface may ensure that the locking link 232 does not maintain contact with the mating surface 218 of the guide/restraint head 210 when the guide/restraint head 210 is supposed to be retracting, as illustrated in FIG. 5B. In various embodiments, the pin 236 is configured to rotate about a longitudinal axis defined by the pin 236. In this regard, the pin 236 may rotate when traveling over the tab 238, which may prevent wear of the pin 236 and/or the tab 238 during use of the anti-rollout assembly, in accordance with various embodiments. Although the pin 236 is described as being configured to rotate, the pin 236 is not limited in this regard. For example, the pin 236 may be stationary and/or configured to slide, in accordance with various embodiments.

In various embodiments, as the force of the cargo (e.g., cargo 16 from FIG. 1) continues to drive the overridable trigger 220 in a clockwise direction, the drive link 234 drives the guide/restraint head 210 at coupling 235 about the torsion spring 250 in a direction opposite to the bias of the torsion spring 250, causing the guide/restraint head 210 to rotate counterclockwise into the cavity 244 of the housing 240 as illustrated in FIG. 5C. In various embodiments, the coupling 235 creates a moment arm measured from the torsion spring 250.

In various embodiments, the guide/restraint head 210 further comprises an aperture 211 disposed between the mating surface 218 and the coupling 235. In various embodiments, the aperture 211 may allow the locking link 232 an area to travel through during the retracting to prevent the locking link 232 from contacting the guide/restraint head 210.

In various embodiments, in response to a cargo being entirely or nearly entirely over the anti-rollout assembly, as illustrated in FIG. 5D, the guide/restraint head 210, the overridable trigger 220, and the locking system 230 are all stored in the housing 240, in accordance with various embodiments. In this regard, a downward force from the cargo (e.g., cargo 16 from FIG. 1), may maintain the anti-rollout assembly in the retracted state (e.g., FIG. 5D), until the cargo passes the overridable trigger 220, at which point the torsion spring 250 will begin to bias the anti-rollout assembly towards the raised state, causing the anti-rollout assembly to move from a FIG. 5D position to a FIG. 5C position to a FIG. 5B position, and back to a FIG. 5A position, in accordance with various embodiments.

Figure 6:
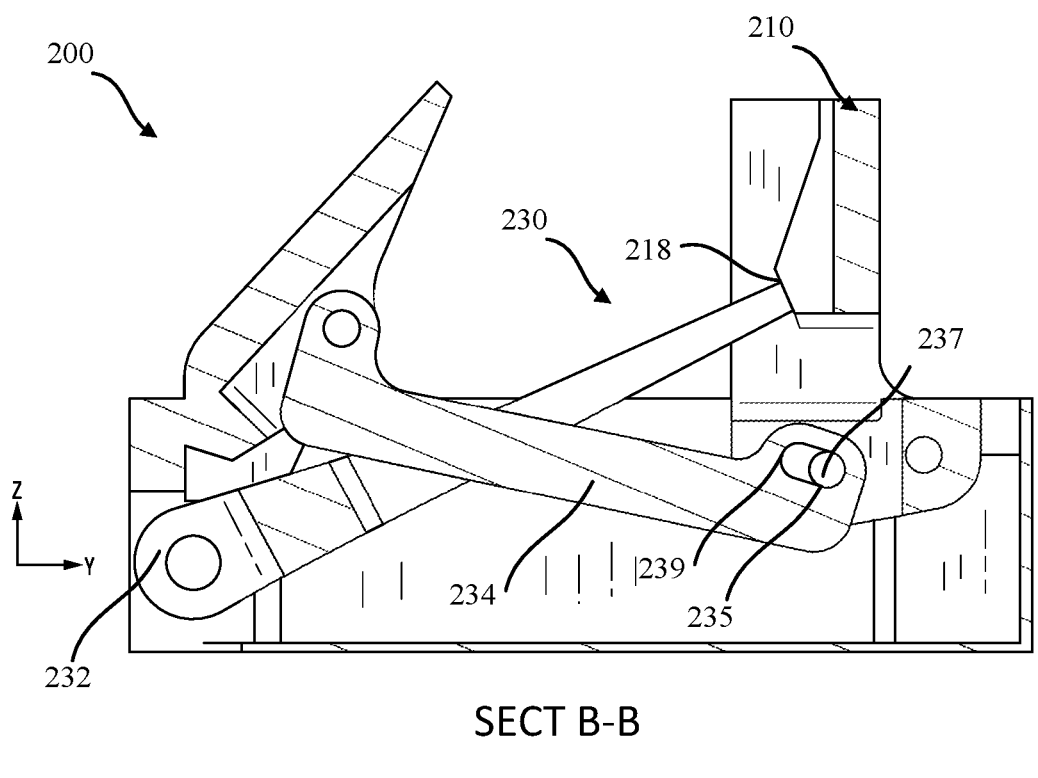
FIG. 6 illustrates a cross-sectional view along section B-B of FIG. 4 of an anti-rollout assembly in a raised state, in accordance with various embodiments.

Referring now to FIG. 6, a cross-sectional view of the anti-rollout assembly 200 from FIG. 4 is illustrated, in accordance with various embodiments. In various embodiments, drive link 234 is slidingly coupled to the guide/restraint head 210 at the coupling 235 of the locking system 230. In this regard, a pin 237 may be disposed through the guide/restraint head 210 and through a slot 239 in the drive link 234, causing the driving link to move a certain distance before driving the guide/restraint head 210 to rotate inward. Thus, in various embodiments, the slot 239 may ensure the locking link 232 is rotated out of the way of the mating surface 218 before driving the guide/restraint head 210 inward.

In various embodiments, the anti-rollout assembly 200 may further comprising a locking mechanism configured to lock the anti-rollout assembly 200 in a retracted state. For example, the anti-rollout assembly 200 may include a latch configured to extend over the overridable trigger to keep the anti-rollout assembly 200 in a retracted state for unloading the cargo handling system 50 from FIG. 2. In various embodiments, the locking mechanism may be any locking mechanism known in the art, such as a latch, a lock for the torsion spring, or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

We claim:

1. An anti-rollout assembly, comprising:
   a housing defining a cavity;
   a guide/restraint head pivotably coupled to the housing at a first end of the cavity;
   an overridable trigger pivotably coupled to the housing at a second end of the cavity, the second end opposite the first end; and
   a locking system operably coupled to the guide/restraint head and the overridable trigger, the locking system configured to bias the guide/restraint head into an upright position, the locking system configured to retract the guide/restraint head into the cavity in response to a first lateral force driving the overridable trigger, wherein the locking system further comprises a locking link and a driving link.

2. The anti-rollout assembly of claim 1, wherein the driving link is pivotably coupled to the overridable trigger and slidingly coupled to the guide/restraint head.

3. The anti-rollout assembly of claim 2, wherein the locking link is pivotably coupled to the housing and configured to interface with a mating surface of the guide/restraint head when the guide/restraint head is in a raised state.

4. The anti-rollout assembly of claim 1, wherein the locking system further comprises a pin rotatably coupled to the driving link, the pin configured to interface with a tab on the locking link in response to the anti-rollout assembly being in a raised state.

5. The anti-rollout assembly of claim 4, wherein the pin is configured to drive the locking link down in response to rolling over the tab during retraction of the guide/restraint head.

6. The anti-rollout assembly of claim 1, wherein:
   the guide/restraint head comprises a guide face; and
   the locking link locks the guide/restraint head in the upright position in response to a second lateral force being exerted on the guide face.

7. The anti-rollout assembly of claim 6, wherein the guide/restraint head further comprises a first roller on a first longitudinal end of the guide/restraint head and a second roller on a second longitudinal end of the guide/restraint head.

8. The anti-rollout assembly of claim 7, wherein the first roller is configured to guide a tab of a pallet toward the guide face in response to the pallet traveling longitudinally along a cargo deck.

9. An anti-rollout system for use in a cargo handling system, the anti-rollout system comprising:
   a cargo deck having an entranceway; and
   the anti-rollout assembly of claim 1 coupled to the cargo deck and disposed proximate the entranceway.

10. The anti-rollout system of claim 9, wherein:
    the anti-rollout assembly being biased towards a raised position,
    the anti-rollout assembly is configured to retract into an overridable position in response to a cargo traveling over the anti-rollout assembly during loading, and
    the anti-rollout assembly configured to arise to the raised position in response to the cargo traveling past the anti-rollout assembly in a first direction.

11. The anti-rollout system of claim 10, further comprising a first of the anti-rollout assembly and a second of the anti-rollout assembly, wherein:
    the overridable trigger of the first of the anti-rollout assembly is disposed proximate the entranceway;
    the guide/restraint head of the first of the anti-rollout assembly has a first guide face defining the first direction when the guide/restraint head is in a raised state,
    the guide/restraint head of the first of the anti-rollout assembly is disposed distal to the overridable trigger of the first of the anti-rollout assembly in a lateral direction;
    the overridable trigger of the second of the anti-rollout assembly is disposed distal to the guide/restraint head of the first of the anti-rollout assembly in the lateral direction; and
    the guide/restraint head of the second of the anti-rollout assembly is disposed distal to the overridable trigger of the second of the anti-rollout assembly in the lateral direction.

12. The anti-rollout system of claim 11, wherein:
    the overridable trigger of the first of the anti-rollout assembly is configured to retract the guide/restraint head of the first of the anti-rollout assembly in response to the first lateral force being disposed on the overridable trigger of the first of the anti-rollout assembly; and
    the overridable trigger of the second of the anti-rollout assembly is configured to retract the guide/restraint head of the second of the anti-rollout assembly in response to a second lateral force being disposed on the overridable trigger of the second of the anti-rollout assembly.

13. The anti-rollout system of claim 9, further comprising a plurality of the anti-rollout assembly spaced longitudinally along the entranceway.

* * * * *